(12) United States Patent
Poscher et al.

(10) Patent No.: US 11,252,648 B2
(45) Date of Patent: Feb. 15, 2022

(54) PACKET FLOW OPTIMIZATION IN A TRANSPORT NETWORK

(71) Applicant: Telefonaktiebolaget LM Ericsson (publ), Stockholm (SE)

(72) Inventors: Jens Poscher, Aachen (DE); Ralph Detke, Herzogenrath (DE); Stefan Eichinger, Pulheim (DE); Sevil Senturk, Leonberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 16/330,782

(22) PCT Filed: Sep. 9, 2016

(86) PCT No.: PCT/EP2016/071293
§ 371 (c)(1),
(2) Date: Mar. 6, 2019

(87) PCT Pub. No.: WO2018/046090
PCT Pub. Date: Mar. 15, 2018

(65) Prior Publication Data
US 2019/0191364 A1 Jun. 20, 2019

(51) Int. Cl.
*H04W 48/00* (2009.01)
*H04W 36/30* (2009.01)
(Continued)

(52) U.S. Cl.
CPC ....... *H04W 48/17* (2013.01); *H04W 28/0257* (2013.01); *H04W 28/10* (2013.01); *H04W 36/30* (2013.01); *H04W 40/12* (2013.01)

(58) Field of Classification Search
None
See application file for complete search history.

(56) References Cited

U.S. PATENT DOCUMENTS 9,084,155 B2 7/2015 Rubin et al.
2006/0233135 A1* 10/2006 Oswal ............... H04W 36/0033
370/331

(Continued)

FOREIGN PATENT DOCUMENTS

WO WO 2015/130202 A1 9/2015
WO 2016/105568 A1 6/2016
WO WO 2016/202358 A1 12/2016

OTHER PUBLICATIONS

International Search Report and Written Opinion of the International Searching Authority, PCT/EP2016/071293, dated May 12, 2017, 12 pages.

(Continued)

*Primary Examiner* — Hong Shao
(74) *Attorney, Agent, or Firm* — Sage Patent Group

(57) ABSTRACT

The application relates to a method for operating a flow control entity configured to control a data packet flow in a radio access network and a transport network of a communications network. It is determined that a transmission condition for the data packet flow through the communications network has changed, and determined through which radio access node the data packet flow is transmitted. A new anchor point for the data packet flow is determined in dependence on the radio access node, and a bearer control entity is informed about the new anchor point.

16 Claims, 11 Drawing Sheets

(51) Int. Cl.
*H04W 40/12* (2009.01)
*H04W 28/02* (2009.01)
*H04W 28/10* (2009.01)

(56) References Cited

U.S. PATENT DOCUMENTS

| | | | | |
|---|---|---|---|---|
| 2010/0291943 | A1* | 11/2010 | Mihaly | H04L 67/1031 |
| | | | | 455/450 |
| 2015/0131437 | A1* | 5/2015 | Kim | H04W 28/12 |
| | | | | 370/230 |
| 2015/0223190 | A1* | 8/2015 | Backman | H04W 64/003 |
| | | | | 370/328 |
| 2016/0150448 | A1 | 5/2016 | Perras et al. | |
| 2016/0249183 | A1* | 8/2016 | Kim | H04H 20/59 |
| 2016/0323919 | A1* | 11/2016 | Xu | H04W 48/08 |
| 2017/0374579 | A1* | 12/2017 | Wang | H04W 28/0278 |

OTHER PUBLICATIONS

Stefan Dahlfort et al, Radio Access and transport network interaction—a concept for improving QoE and resource utilization, Ericsson Review, Jul. 3, 2015, XP055368880, pp. 1-8.

European Office Action issued in corresponding EP Application No. 16774631.2 dated Oct. 23, 2019, 06 Pages. The references therein have previously been made of record.

European Office Action issued in corresponding EP Application No. 16774631.2 dated Jul. 9, 2020, 05 Pages. The references therein have previously been made of record.

European Office Action issued in corresponding EP Application No. 16774631.2 dated Dec. 21, 2020, 05 Pages.

* cited by examiner

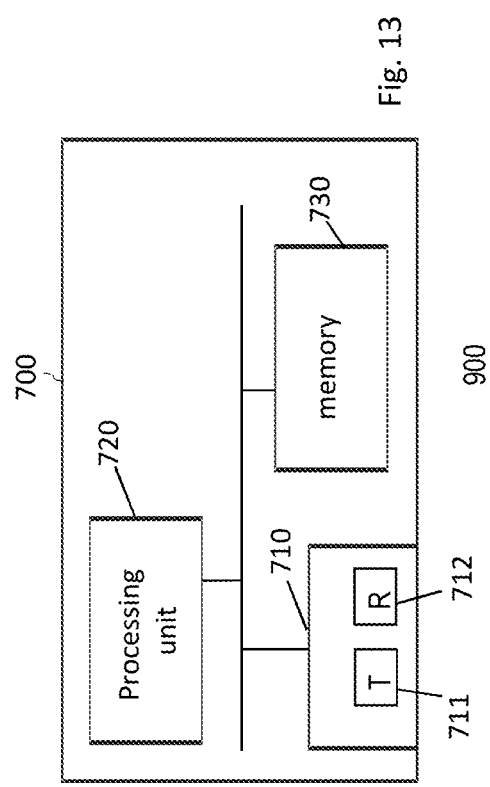

PACKET FLOW OPTIMIZATION IN A TRANSPORT NETWORK

CROSS REFERENCE TO RELATED APPLICATIONS

This application is a 35 U.S.C. § 371 national stage application of PCT International Application No. PCT/EP2016/071293 filed on Sep. 9, 2016, the disclosure and content of which is incorporated by reference herein in its entirety.

TECHNICAL FIELD

The present application relates to a method for operating a flow control entity configured to control a data packet flow in a radio access network and a transport network of a communications network. Furthermore, a method for operating a bearer control entity configured to control a bearer for the data packet flow is provided. Additionally the corresponding flow control entity, bearer control entity and a gateway handling the data packet flow are provided.

Further, a computer readable storage medium and a system comprising the bearer control entity and the flow control entity are provided.

BACKGROUND

With the introduction of RTI (RAN (Radio Access Network) Transport Interaction) with a central controller instance (RTI-C) interfacing radio base station and access router equipment, the network is enabled to react on congestion within the radio and access IP (Internet Protocol) transport network. If the system observes overload situations in the transport it can support the UE (User Equipment) movement towards a new cell connected to an access transport network leg which does not experience congestion, thus resolving a bottleneck situation. As an alternative the RAN might change other behavior like coordination features or the transport path via SDN (Software Defined Networking), as discussed in WO 2015/130202.

With future 5G services for low latency use cases, when the UE changes the cell where it connects to the Radio Access Network and the user plane serving node/anchor point remains the same, low latency for the user plane and/or control plane can't be guaranteed.

FIG. 1 shows a current implementation of an RTI system which focuses on transport optimization for a data packet flow between the radio access network and the IP access/aggregation network. A centralized control entity 10 is aware of the load situation in the radio and transport access network. This means that the centralized control entity 10 is aware of the load situation in the radio access nodes 50, 51 and in the routers 60, 61. In current implementations, during bearer activation a serving Packet Gateway such as Gateways 70, 71, 72, 73 serving the requested APN (Access Point Name) is selected by the system based on static DNS (Domain Name Server) FQDN (Fully Qualified Domain Name) lists. In the case above one of the gateways is selected serving the APN "enterprise", for example in a round robin manner or based on a preferred node. This does not take into account network characteristics like for example latency.

If the UE is moved to a new transport segment by RTI (e.g. FIG. 1 where UE changes from radio access node 51 to 50) it might not be sufficient to ensure low latency for latency critical applications because the application user plane anchor point, the gateway (for example 70), remains the same. This can have negative impact on service characteristics, e.g. latency, for the respective new use case.

SUMMARY

Accordingly a need exists to overcome the above mentioned drawbacks and to maintain the service characteristics even when a transmission condition for the data packet flow changes.

This need is met by the features of the independent claims. Further aspects are described in the dependent claims.

A method for operating a flow control entity is provided which is configured to control a data packet flow in a radio access network and a transport network of a communications network. The method comprises the step of determining that a transmission condition for the data packet flow through the communications network has changed. Furthermore, it is determined through which radio access node the data packet flow is transmitted. Additionally a new anchor point for the data packet flow is determined in dependence on the radio access node and a bearer control entity is informed about the new anchor point.

When the transmission conditions for the data packet flow change, determination of a new anchor point may be necessary in order to keep the service parameters, such as for example latency, for the data packet flow on an acceptable level. The experienced quality of service should not suffer from a change of the transmission condition. With the determination of a new anchor point it is possible to maintain the desired transmission condition parameters such as for example latency, packet loss and/or jitter.

Furthermore, a method for operating a bearer control entity is provided configured to control a bearer for the data packet flow in the communications network. In this method, a bearer modification message is received for a user of the data packet flow from the flow control entity configured to control the data packet flow for the user in a radio access network and a transport network of the communications network. Further, a new anchor point for the bearer is received from the flow control entity and the anchor point for the data packet flow is moved to the new anchor point.

Here, the bearer control entity receives the information that the bearer should be modified. Furthermore, information about a new anchor point for the bearer is received and the (old) anchor point is moved to the new anchor point in order to keep the service parameters for the data packet flow in the desired quality range.

According to a further aspect, a method for operating a bearer control entity configured to control a bearer for a data packet flow in a communications network is provided. A bearer setup message for a user of the data packet flow is received. Additionally it is determined whether the user is a service optimized user which is provided with a better service for the data packet flow in comparison to other users. If this is the case, information about an anchor point for the data packet flow is requested from a flow control entity, which is configured to control a data packet flow for the user in a radio access network and a transport network of the communications network. The information about the anchor point is received from the flow control entity and a bearer for the data packet flow through the anchor point is set up which is determined based on the received information. The service optimized user is a user which is provided with better transmission condition parameters such as for example delay, jitter and/or packet loss than other users.

When a new bearer is set up, it is checked whether the user is a service optimized user. If this is the case, the new anchor point is provided or retrieved from the flow control entity in order to guarantee the desired service parameters.

Additionally the corresponding flow control entity and bearer control entity are provided. The flow control entity comprises a memory and at least one processor, the memory containing instructions executable by said at least one processor, wherein the flow control entity is operative to carry out the steps of the flow control entity mentioned above and discussed in further detail below. The bearer control entity comprises a memory and at least one processor the memory containing instructions executable by said at least one processor, wherein the bearer control entity is operative to carry out the steps of the bearer control entity discussed above and discussed in further detail below.

The flow control entity can also comprise a module configured to determine that a transmission condition for the data packet flow through the communications network has changed, and a module configured to determine through which radio access node the data packet flow is transmitted. A module can be configured to determine a new anchor point for the data packet flow in dependence on the radio access node, and an interface can be configured to inform a bearer control entity about the new anchor point.

The bearer control entity can comprise an interface configured to receive a bearer modification message for a user of the data packet flow from a flow control entity configured to control the data packet flow for the user in a radio access network and a transport network of the communications network. The interface can be further configured to receive a new anchor point for the bearer from the flow control entity. Additionally a module of the bearer control entity can be provided configured to move the anchor point for the data packet flow to the new anchor point.

According to another aspect the bearer control entity can comprise an interface configured to receive a bearer setup message for a user of the data packet flow. The bearer control entity can furthermore comprise a module configured to determine whether the user is a service optimized user which is provided with a better service for the data packet flow in comparison to other users. If this is the case a module of the bearer control entity can be configured to request information about an anchor point for the data packet flow from a flow control entity configured to control a data packet flow for the user in a radio access network and a transport network of the communications network. The interface can be further configured to receive the information about the anchor point from the flow control entity. A module of the bearer control entity can be configured to set up a bearer for the data packet flow through the anchor point which is determined based on the received information.

Additionally a gateway is provided configured to handle a data packet flow in the communications network. The gateway comprises a module configured to determine transmission condition parameters for the data packet flow handled by the gateway. Furthermore, an interface is provided configured to transmit the determined transmission condition parameters to a flow control entity, which is configured to control a data packet flow in a radio access network and a transport network of the communications network.

Additionally the gateway can comprise a memory and at least one processor, the memory containing instructions executable by said at least one processor, wherein the gateway is operative to carry out the steps in which the gateway is involved as above and as discussed in further detail below.

When the gateway informs the flow control entity of the flow conditions, the flow control entity can determine whether the transmission conditions have changed such that it is necessary to select a new anchor point for the data packet flow in the core network in order to keep the service parameters at a desired level.

Furthermore a system comprising the flow control entity and the bearer control entity is provided.

Additionally a computer program comprising program code to be executed by the at least one processor of a flow control entity or a bearer control entity is provided, wherein execution of the program code causes the at least one processor to execute a method as mentioned above or as discussed in further detail below. Additionally a carrier comprising the computer program is provided.

It is to be understood that the features mentioned above and features yet to be explained below can be used not only in the respective combinations indicated, but also in other combinations or in isolation without departing from the scope of the present embodiments. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 13 shows an example schematic representation of a gateway handling the data packet flow and collecting transmission condition parameters for the data packet flow.

FIG. 14 shows another example schematic representation of a gateway handling the data packet flow and collecting transmission condition parameters for the data packet flow.

DETAILED DESCRIPTION OF EMBODIMENTS

Figure 1:
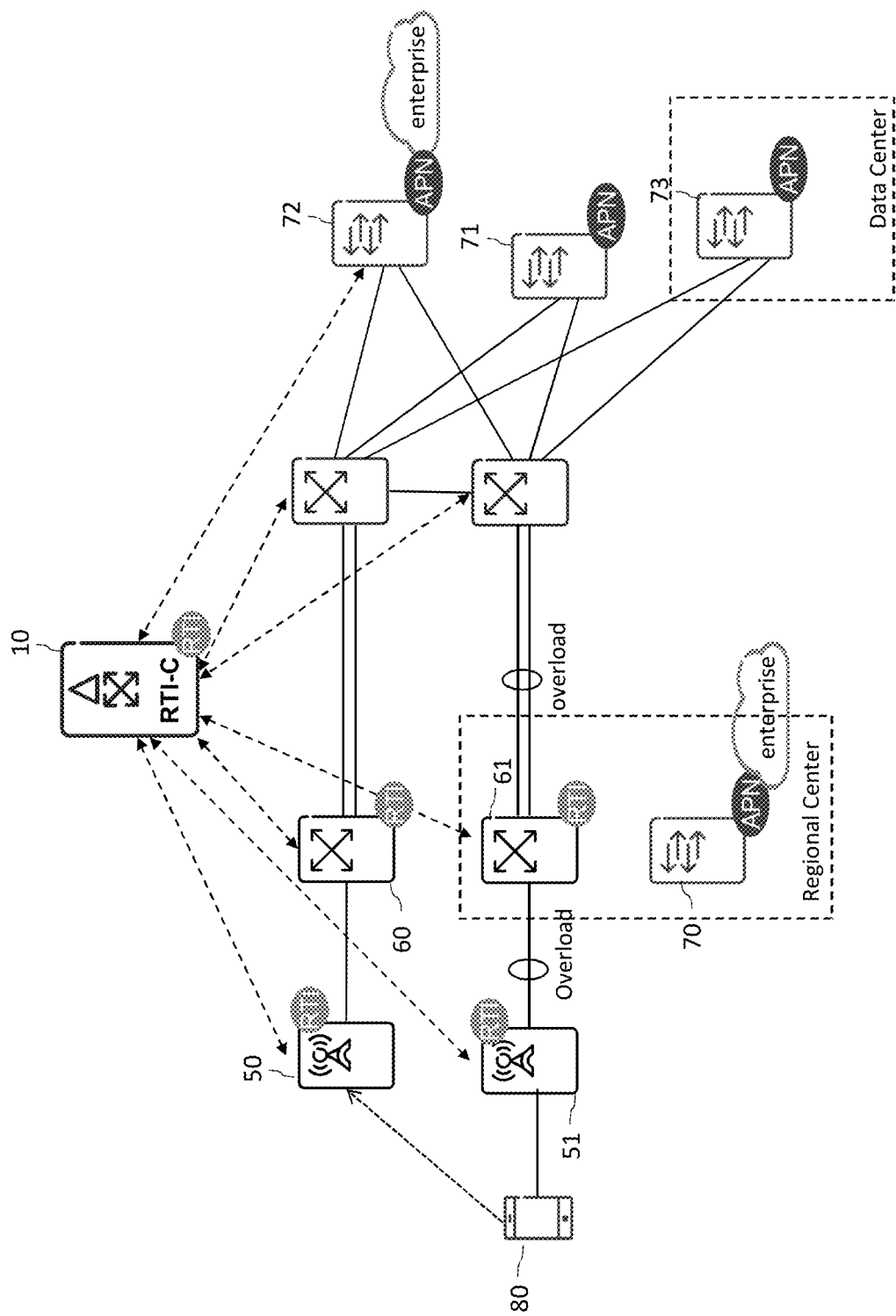
FIG. 1 shows a schematic overview over an RTI network known in the art.

In the following, embodiments will be described in detail with reference to the accompanying drawings. It is to be understood that the following description of embodiments is not to be taken in a limiting sense. The scope is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Figure 2:
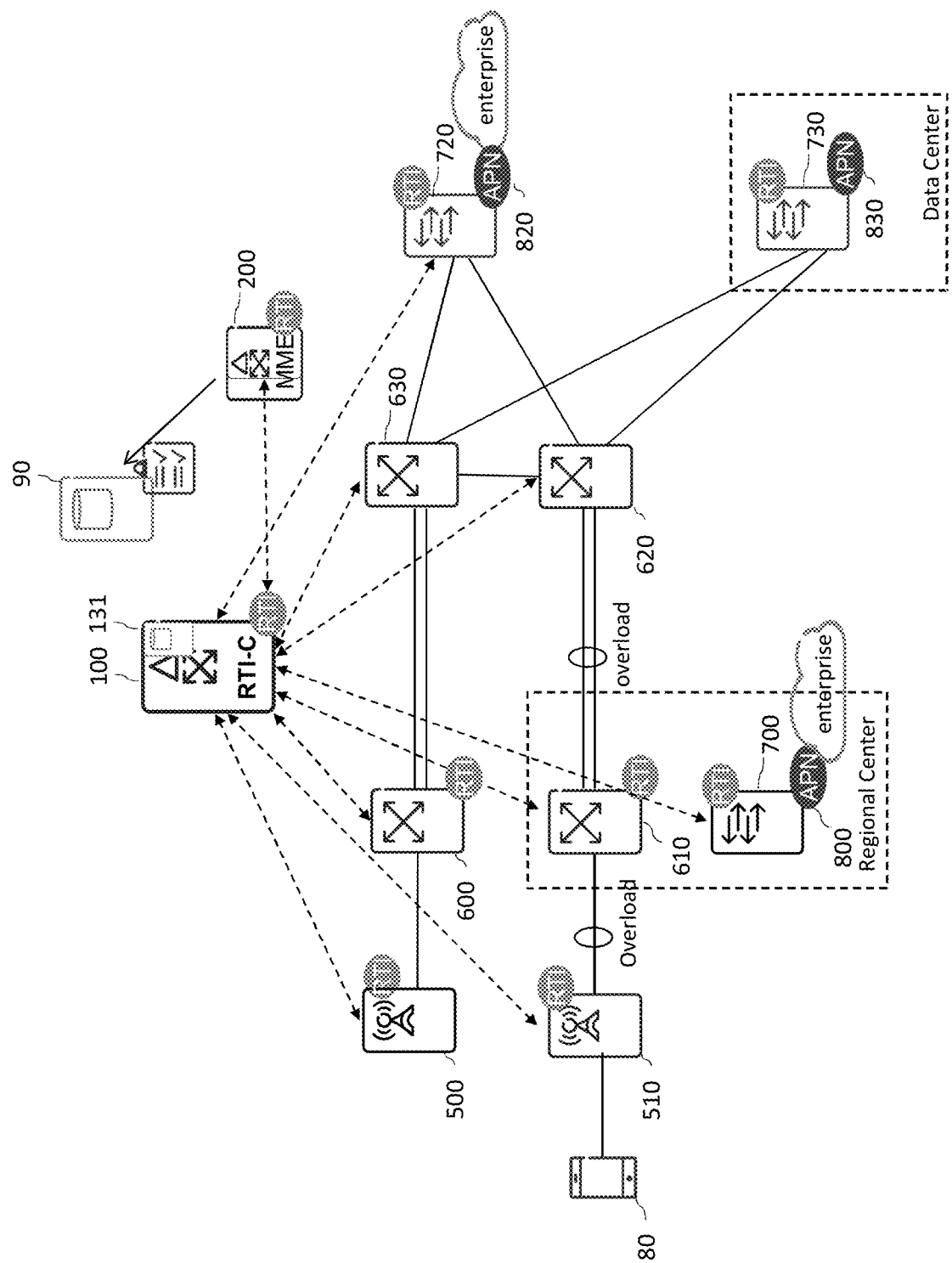
FIG. 2 shows a schematic example architectural overview of an RTI network comprising nodes, which incorporate features of an embodiment.

FIG. 2 shows a schematic overview over an example network comprising components incorporating features of an embodiment. A mobile entity 80 is receiving a data packet flow of a service, which is offered by an enterprise through different APNs. The service can be offered virtualized in distributed data centers (Mobile Edge Computing) or PNF (Physical Network Functions). Based on the use case and service requirements, the mobile entity (or UE) 80 may be attached to different APNs 800, 820, 830 serving the connectivity to the external PDN (Packet Data Network), like for example an industry application (low latency, enterprise APN) or the internet. Access to the APNs 800, 820, 830 is possible at different locations or points of locations. The data packet flow can be part of a message exchange in a car-to-car communication scenario e.g. when traffic related data is exchanged.

An MME (Mobility Management entity) 200 and S/PGw (serving/packet gateway) 700 to 730 are enhanced with RTI logic interfacing towards a central flow control entity 100, shown as RTI-C in FIG. 2. The S/PGw 700 to 730 can report the service characteristics to the flow control entity 100. To change the bearer respectively the service anchor, the flow control entity 100 can instruct the MME 200 to change/ modify the bearer according to a specific Location Area (LA). As shown in FIG. 2 an overload can occur between a radio access node 510 and router 610, or between two routers 610 and 620. Furthermore, two Radio Access Nodes 500, 510 are shown wherein the UE 80 is currently connected to access node 510. A radio access node may be an evolved node B (eNB).

Figure 3:
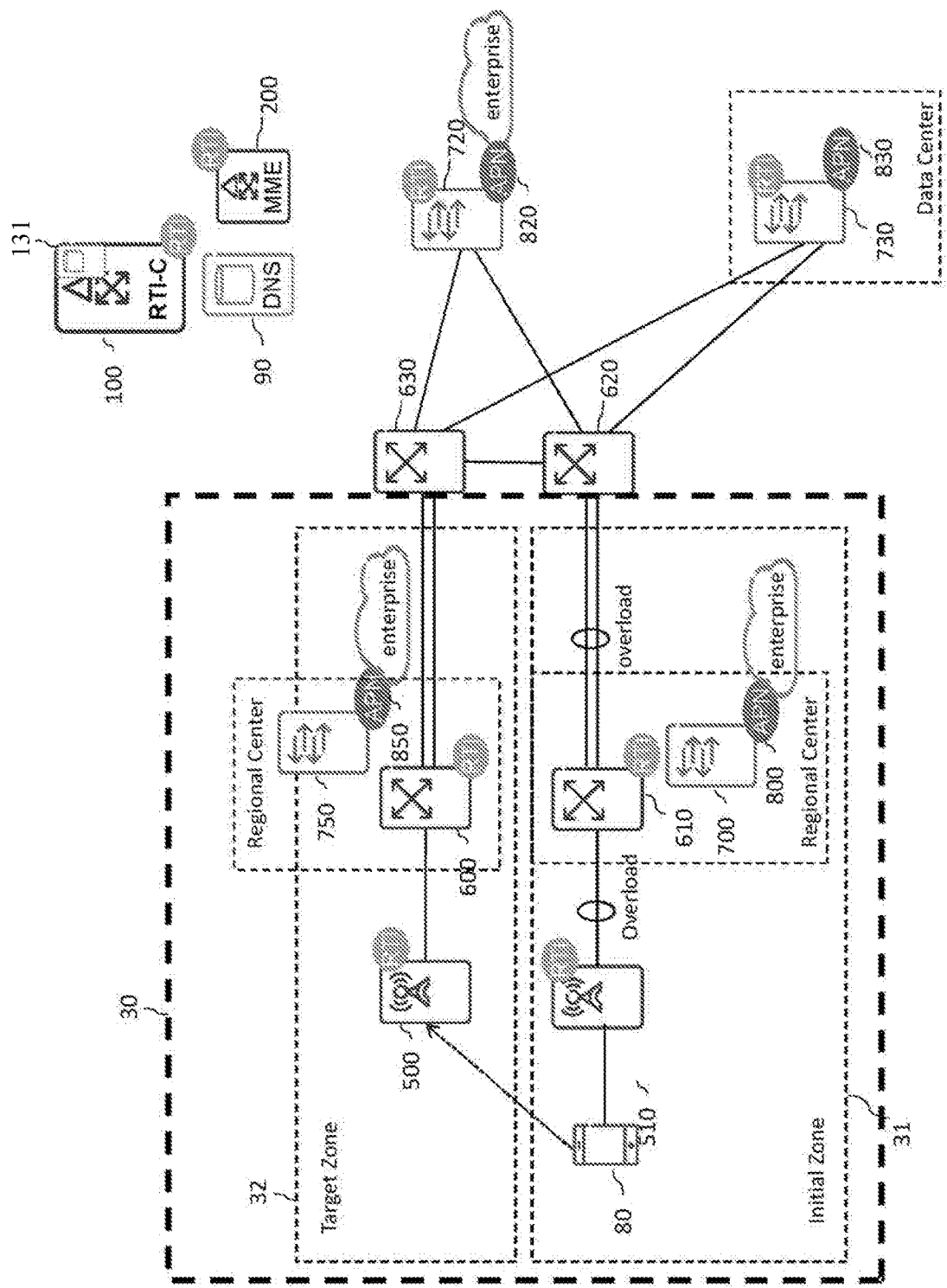
FIG. 3 shows the network of FIG. 2 comprising performance optimized service areas.

Additionally a DNS server 90 is provided. As will be discussed in more detail below, either the DNS server 90 is accessed by the MME for identifying an anchor point of a data packet flow or a DNS server 131 provided in the flow control entity 100 is accessed. When the user is a service optimized user who is provided with a better service for the data packet flow in comparison to other users, a request will be transmitted by the MME to the DNS server 131. A Request from other (non service optimized) users will be transmitted by the MME to the DNS Server 90. The DNS server 131 may be provided in the flow control entity 100 and may be thus part of it, however it is also possible that the DNS server 131 is separate but controlled by the flow control entity 100. The flow control entity is configured to control data packet flows in the radio access network and in the transport network. The core network of a cellular network, to which most of the components shown in FIG. 2 belong, can be part of the transport network and the gateways may also be part of the core network As shown in FIG. 3, the operator network may comprises a "performance optimized service area" 30 to allow service performance optimization in this area. This performance optimized service area 30 is under control of the flow control entity 100 for performance optimization and may be further divided into two or more zones 31 and 32. For each zone 31, 32 the end-to-end performance, e.g. latency, is known in the flow control entity 100 (e.g. based on measurements). Certain applications may run in different location. This can mean that a running application is moved from the main data center to a regional data center. Would now an application or a user have strict performance requirements the flow control entity 100 is responsible to keep UE access and service anchor point within the area. If the UE 80 moves (or is moved) to another zone the mechanism discussed in more detail below moves also the anchor point of the user plane into the new zone, for example if a threshold for an end-to-end performance parameter is crossed (e.g. if latency is above a threshold). The performance optimized area could correspond to SLA (Service Level Agreement) the service provider has agreed with the customer. Zones and performance thresholds are defined in the flow control entity 100.

As already mentioned in connection with FIG. 2, the flow control entity may comprises a DNS 131. The FQDN (Fully Qualified Domain Name) list per APN can be stored in the flow control entity 100 internal DNS server 131. The flow control entity 100 contains information about the zone where the APN is served. This allows the MME 200 to contact the internal DNS server 131 of the flow control entity 100 to obtain a SGw and PDN Gw based on an FQDN (for example a Tracking Area Code (TAC) and APN). In the present case, when the location of the mobile entity is known, (its tracking area) the closest best fitting SGw and/or PDN gateway is selected with dynamically defined DNS entries compared to statically defined DNS entries.

Static DNS entries contain the network setup defined by the operator. Queries result in a 'static' decision, which nodes to address (the entries in the DNS).

The dynamic part contains already the network conditions, so that the DNS entries are updated to reflect the reachable/preferred nodes in its queries (the entries in the DNS contain the updated list of nodes to choose).

The flow control entity 100 is enhanced with a new logic modelling two or more geographical "zones" 31, 32 representing areas optimized for best quality of experience, e.g. low latency, low packet loss, low jitter.

The flow control entity 100 knows which radio access node 500 and 510, routers 600 to 630 and application anchor points (S/P Gw) 700 to 730 are in each zone. To receive performance data like for example delay or packet loss or jitter a new interface between S/P GW 700 to 730/radio access node 500 and the flow control entity 100 is introduced. This interface provides knowledge to the flow control entity 100 in real time about the performance either per UE or per group of UEs using for example a tunnel interfaces between radio access node 500, 510 and S/P Gw 700 to 730.

By this the flow control entity 100 is aware of the performance situation in radio, transport and service anchor network elements.

Furthermore, the flow control entity 100 may comprises a mechanism to calculate a good enough or best performing S/P Gw 700 to 730 (anchor point) for each zone 31, 32 and provides identification information of the good enough or best performing S/P Gw to the MME 200. This can be done for example via the internal DNS server 131 of the flow control entity 100 accessed by the MME to obtain S/P Gw FQDN to be used. Whether the performance is good enough or sufficient can be determined based on the parameters such as latency, packet loss, or jitter. Furthermore the flow control entity can look into higher layers and consider parameters such as bit error rate, frame error rate, frame loss (e.g. for video data). The best performing gateway can be selected by selecting the gateway with the best (e.g. lowest) parameter values and whether a sufficient performance is obtained may be determined by comparing at least some of the above mentioned parameters to predefined threshold values.

The S/P Gw identification information is provided to the MME 200 for the following cases via new procedures on the interface between MME 200 and flow control entity 100:

For new established connections, the MME 200 may request this information from the flow control entity 100 DNS server 131. The flow control entity 100 calculated a good enough or the best S/P Gw for a specific zone and stores this as S/P Gw FQDN in DNS 131. The MME 200 is enhanced with additional subscription data defining whether a certain subscriber i.e. user should be performance/service optimized (DNS 131 in flow control entity 100 is used) or if standard behavior should apply to the user (normal DNS 90 is used). If the user is a performance/service optimized user the MME 200 queries the DNS 131 of flow control entity 100 for anchor point (S/P GW) information to set-up the new bearer. Based on the FQDN name, and the stored FQDN/anchor point identification mapping in the DNS 131, the anchor point identification information (for example an anchor point address) is returned.

For ongoing sessions, a UE may have been moved to a new zone (for example if UE 80 was moved or moved by itself from zone 31 to zone 32). The flow control entity 100 detects that performance degradation for a specific UE 80 or a group of UEs occurs. This can mean that radio access node 500, 510 and anchor S/P Gw 700-730 are not in the same zone (e.g. after handover of a UE to a new radio access node in a new zone). For packet loss related performance degradation this could mean that UEs, served by the same radio access node but via tunnels to different S/P Gw, experience different packet loss. As a consequence the flow control entity 100 can inform the MME 200 about a new anchor point (new S/P GW) for the UE by directly sending identification information of the new anchor point to the MME 200, or the flow control entity 100 can trigger a new anchor point obtaining process at the MME 200. In the latter case the flow control entity 100 selects a good enough or the best anchor point (for example S/P Gw) for the UE (or the group of UEs) and updates the identified good enough (or the best) anchor point identification information associated to the FQDN in DNS 131. The selection may be done based on the zone concept. The MME 200 will then query the new anchor point identification by sending a DNS request comprising the FQDN to DNS 131.

The flow control entity 100 may be also aware of the application serving the user and the end-to-end characteristics e.g. the latency in the EPS (Evolved Packet System). The flow control entity 100 might then instruct the system to move the service anchor, i.e. the anchor point, to another node serving the same service closer to the currently used radio interface by the UE or the group of UEs. This new anchor point is selected to keep required and/or improve the existing service characteristics.

A new interface between the Packet Data Network Gateways 700 to 730 and the flow control entity 100 is provided and in addition, the interface between the service nodes in the telecommunication network are enhanced. Moreover, the flow control entity 100 may comprise DNS capabilities, as shown by DNS server 131, to provide the optimized results for the S/P GWs selection for example at different locations/zones. Furthermore, the MME 200 needs information to distinguish between a (service) optimized user and a normal user to enforce whether the Gateway selection is performed by the flow control entity 100 internal DNS server 131 or the DNS server 90 or if a (new) gateway identification is provided by the flow control entity 100 shall be taken into use (for example only taken into use if the user is a (service) optimized user).

Figure 4:
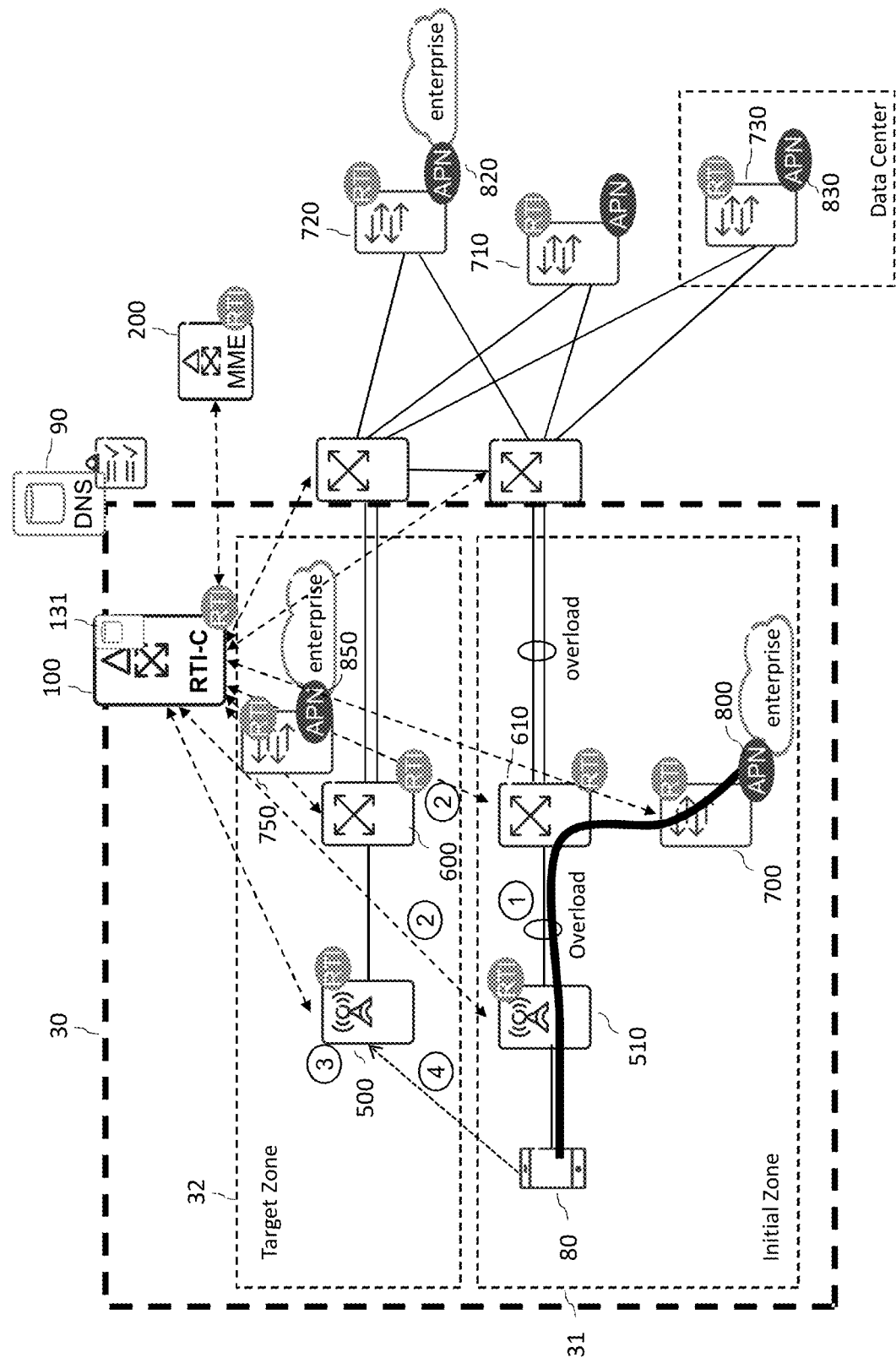
FIG. 4 shows the network of FIG. 2 with a data packet flow, wherein changed transport conditions are detected for the data packet flow.
Figure 5:
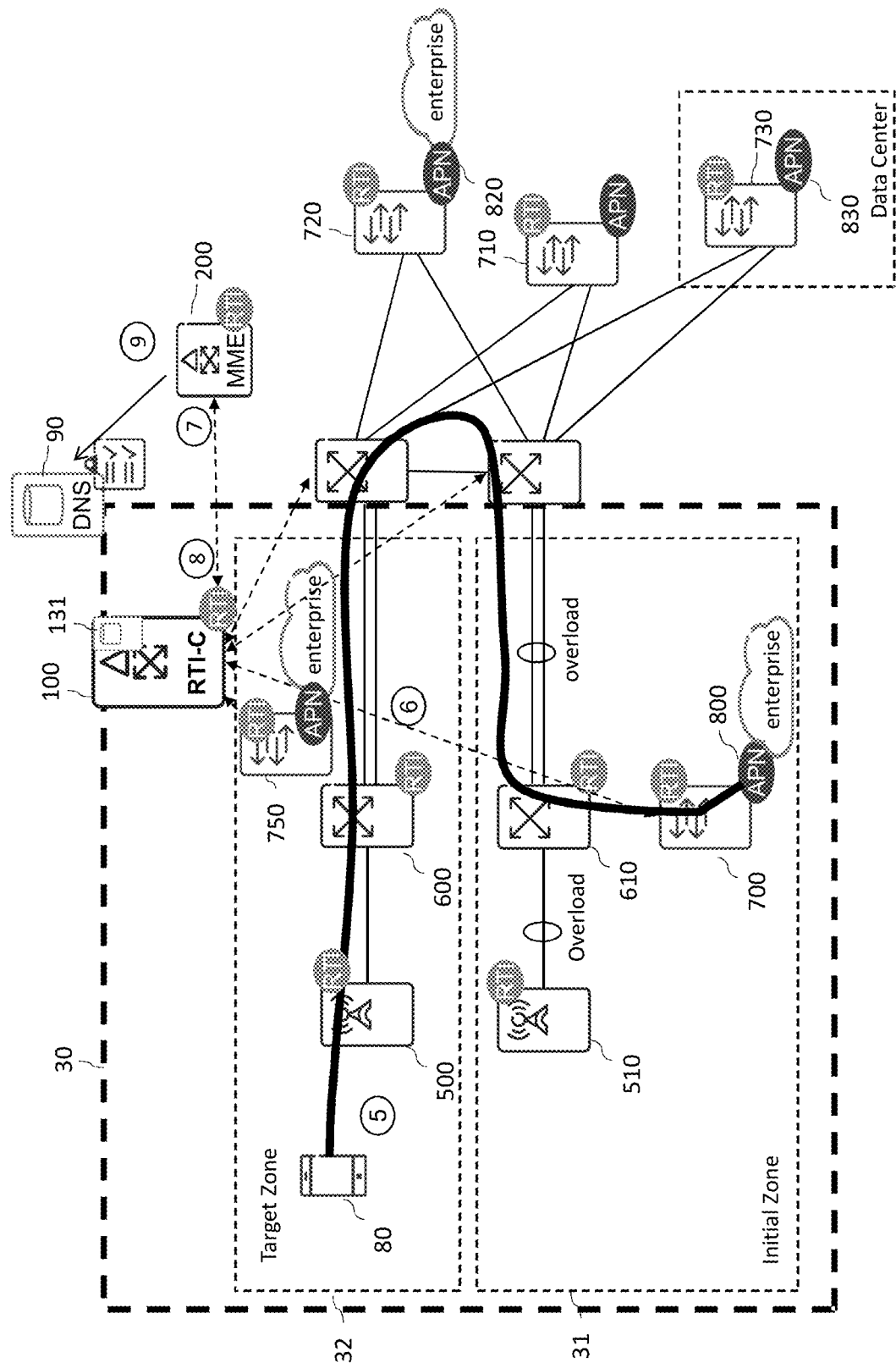
FIG. 5 shows the network of FIG. 2 in a situation where a new radio access node is used for the data packet flow of FIG. 4, but the anchor point remains unchanged.
Figure 6:
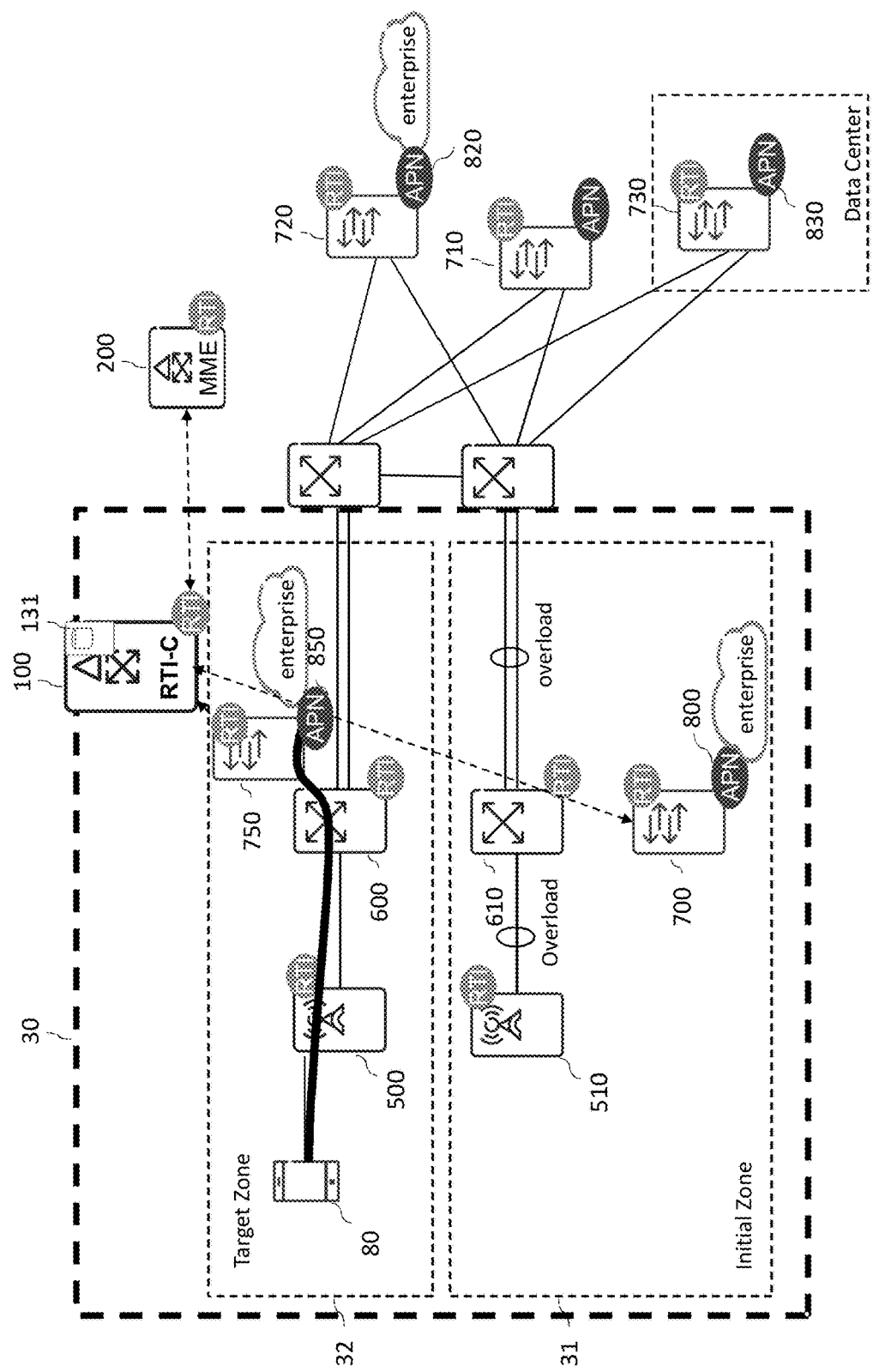
FIG. 6 shows the network of FIG. 5 in a situation in which the anchor point for the data packet flow was changed to a new anchor point.

FIG. 4 explains in more detail an example when a transmission condition for a data packet flow changes and how a traffic overload situation in the transport or the radio access network may influence a location selection/re-selection process of an anchor point for a data packet flow. The steps discussed below are shown in FIGS. 4 to 6 as numbers provided in circles.

Step 1) A Bearer is established between UE 80 and enterprise network (enterprise APN 800) close to the access in the initial zone 31. A congestion (packet loss, jitter) situation occurs in either radio or access IP network.

Step 2) The flow control entity 100 is informed about changed radio and transport conditions via the radio access node 510 or router 610. The flow control entity 100 sends info to the radio access node about the congestion situations so that the radio access node can take this into account to determine when a hand over is beneficial and prepare a handover.

Step 3) The target cell is prepared and UE 80 is instructed to do a handover to radio access node 500 in the target zone 32.

Step 4) Handover takes place and UE 80 leaves initial zone 31. Step 4 can also be a normal handover triggered by a moving UE (e.g. car).

The following steps are discussed in connection with FIGS. 5 and 6.

Step 5) The user plane path is moved to the new cell and zone 32 keeping the anchor point 700 in the initial zone 31 of the CN. The service characteristic requirements may be not fulfilled any longer, e.g. in view of the longer transport path.

Step 6) The flow control entity 100 is aware of a change in the quality of service for this specific user (group of users) for example based on information received from the S/PGw 700/radio access node 500 or by the zone change of the UE 80. Zones can be predefined zones representing certain QoS properties per connection. The enhanced logic in the flow control entity 100 knows about the better QoS properties in the target zone 32 for this example. This can be done using dynamic data from S/P Gw 700 or a zone definition.

Step 7) The MME interface is enhanced to be able to receive bearer modifications triggers or an identification of a new anchor point (S/P Gw) for a specific user or group of user from the flow control entity 100.

Step 8) The flow control entity 100 may trigger the MME 200 on the enhanced interface to modify the bearer for moving UEs (such as for example UE 80) that do not have the radio interface and the anchor point in the same zone. A sub use case can be to trigger the optimization for a specific zone, e.g. the zone 32 in the figure.

The MME 200 may fetch the new anchor point information/identification via a DNS request comprising the FQDN for the anchor point from the internal DNS server 131 of the flow control entity 100. Using the FQDN to define the new anchor point is one method of changing the anchor point but does not exclude other options.

Alternatively the flow control entity 100 may send information/identification of the new anchor point 850 for a UE or a group of UEs directly to the MME 200. The DNS 131 might be part of the flow control entity 100 as shown and the MME 200 receives the records (FQDN <->anchor point identification mapping) from the internal DNS server 131. In the same way all new users attaching within the (for example geographical) area of the initial zone should directly be served by the S/PGw 750.

Step 9) In case the user isn't a service optimized used and/or doesn't request a performance optimized service the DNS 90 is polled. This behavior is dependent on MME enhanced subscription information, specifying the type of the user. Accordingly, the MME 200 can determine whether the user is a normal user or a performance/service optimized user.

The MME 200 instructs the EPS (Evolved Packet System) to modify the bearer to the new anchor point S/PGw 750. As shown in FIG. 6, the bearer is now moved to the new zone 32 with the new anchor point 750 serving better service characteristics.

In the discussion above the anchor point for an existing bearer was moved. However it is also possible that a UE 80 newly attaches to the network. In this embodiment the following steps (not shown) may be carried out:

In a first step the UE 80 sends an attach request to the MME 200. In the second step, the MME 200 may decide based on subscription data of the mobile entity that the user should be performance optimized. A performance optimized user is not a normal user, but a user to which service optimization should be applied. If this is the case the MME 200 requests identification information of the gateway, i.e. the anchor point from DNS 131 of the flow control entity 100. In the next step the flow control entity 100 provides the optimized anchor point information (for example an identification of the optimized anchor point) for the zone where the UE is located, to the MME 200. The MME then follows known bearer establishment procedures.

Figure 7:
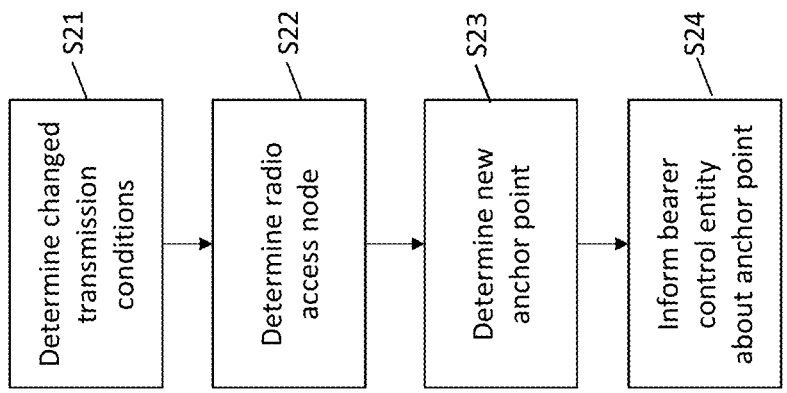
FIG. 7 shows an example flowchart of a method carried out a flow control entity shown in FIGS. 2 to 6.

FIG. 7 summarizes some of the steps carried out by the flow control entity 100. In step S 21 the flow control entity 100 determines that the transmission conditions for the data packet flow have changed. This may be possible as the routers or gateways in the network may transmit information about flow conditions directly to the flow control entity 100. In the next step S 22 the flow control entity 100 determines through which radio access node the packet flow should be transmitted. In dependence on the situation whether overload occurs in the radio access network or in the transport network the radio access node may be changed or not. Alternatively the radio access node may be changed due to UE mobility In step S 23 a new anchor point for the data packet flow is determined taking into account the location of the radio access node determined in step S 22. As discussed above in connection with FIGS. 3 to 5 a bearer modification request may be sent to the bearer control entity, optionally comprising information/identification of the new anchor point. the bearer control entity 200 may transmits a request, such as a DNS request, for the new anchor point to the flow control entity 100. The flow control entity 100 has predefined knowledge which anchor point belongs to which radio access part of the network. When the new anchor point is determined based on the radio access node, the bearer control entity is informed about the new anchor point in step S 24.

Figure 8:
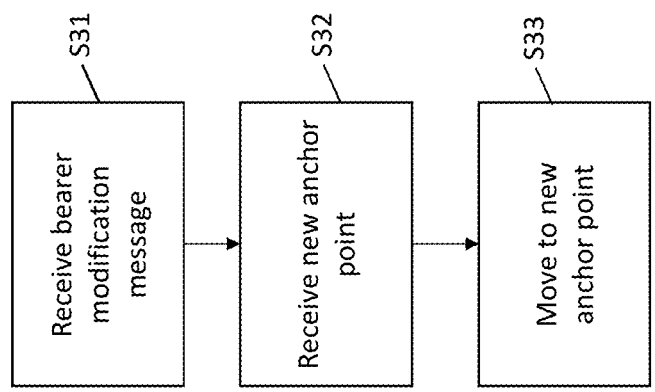
FIG. 8 shows an example flowchart of a method carried out by a bearer control entity shown in FIGS. 2 to 6.

As far as the bearer control entity 200 is concerned, some steps are summarized in FIG. 8. The bearer control entity 200 receives a bearer modification message from the flow control entity 100 in step S 31 and in step S 32 information about the new anchor point is received from the flow control entity 100. As discussed above two scenarios are possible:

In the first scenario the bearer control entity 200 requests the new anchor point from the flow control entity 100 and the bearer control entity 200 receives the new anchor point from the flow control entity 100. In the second scenario the bearer control entity receives the new anchor point from the flow control entity 100 together with the bearer modification request without requesting it. In step S 33 the bearer control entity can move the anchor point for the data packet flow to the new anchor point.

Figure 9:
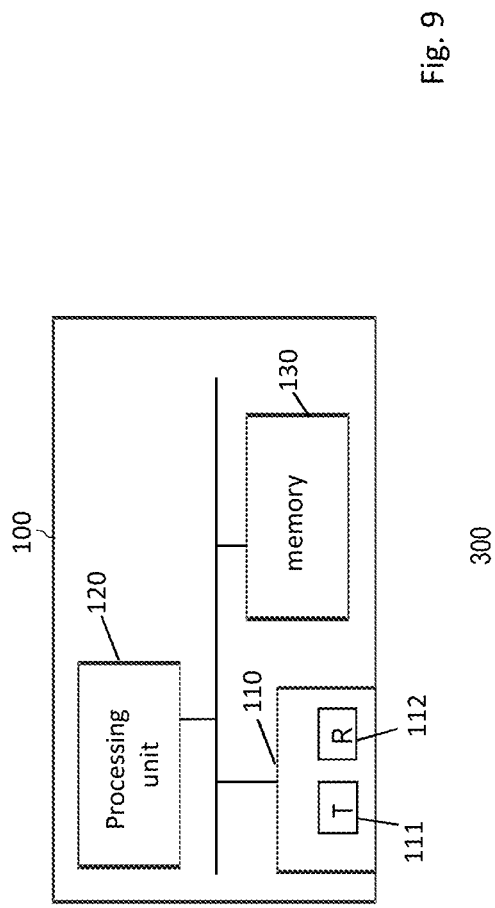
FIG. 9 shows an example schematic representation of a flow control entity configured to determine a new anchor point for a data packet flow.

FIG. 9 shows a schematic architectural view of a flow control entity 100 which can carry out the above discussed steps in which the flow control entity 100 is involved. The flow control entity 100 comprises an interface 110 which is provided for transmitting user data or control messages to other entities via a transmitter 111 and to receive user data and control messages from other entities using receiver 112. The interface is especially qualified to receive information about flow conditions from routers 600-640 or gateways 700 to 750. The interface is furthermore configured for the exchange of information with the bearer control entity 200 as discussed above in connection with FIGS. 5 and 6. The flow control entity 100 furthermore comprises a processor 120 which is responsible for the operation of the flow control entity 100. The processor 120 can comprise one or more processing units and can carry out instructions stored on a memory 130, wherein the memory may include a read-only memory, a random access memory, a mass storage, a hard disk or the like. The memory can furthermore include suitable program code to be executed by the processor 120 so as to implement the above described functionalities in which the flow control entity is involved and which are carried out by the flow control entity.

Figure 10:
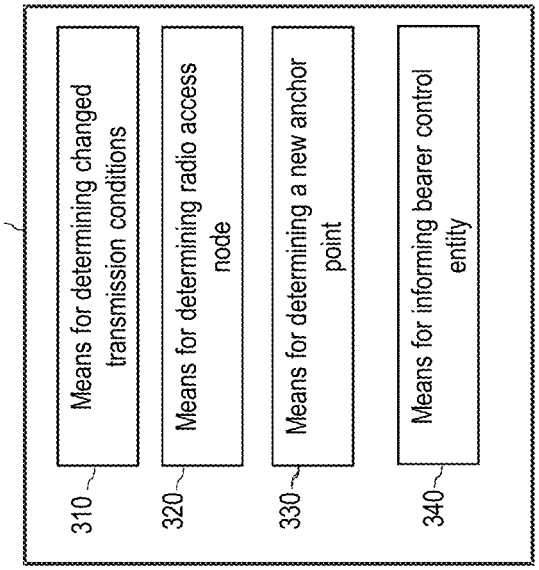
FIG. 10 shows another example of a flow control entity configured to determine a new anchor point for the data packet flow.

FIG. 10 shows a further embodiment of a flow control entity, here entity 300. The entity 300 comprises means 310 for determining changed transmission conditions. Furthermore means 320 are provided for determining a radio access node that is used or is to be used for the changed transmission conditions. Means 330 are provided for determining a new anchor point based on the radio access node, and means 340 are provided for informing the bearer control entity of the new anchor point.

Figure 11:
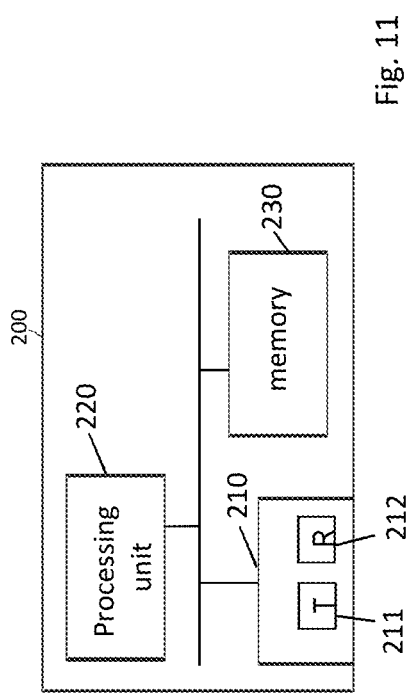
FIG. 11 shows an example schematic representation of a bearer control entity configured to move a bearer to a new anchor point.

FIG. 11 shows a schematic architectural view of a bearer control entity 200 which can carry out the above discussed steps which the bearer control entity is involved. The bearer control entity comprises an interface 210 which is provided for transmitting user data or control messages to other entities via a transmitter 211 and to receive user data or control messages from other entities using receiver 212. The interface 210 is especially qualified to receive information from the flow control entity 100 as discussed above for the exchange of information about the new anchor point. The bearer control entity 200 furthermore comprises a processor 220 which is responsible for the operation of the bearer control entity. The processor 220 can comprise one or more processing units and can carry out instructions stored on memory 230. The memory can furthermore include suitable program code to be executed by the processor to 220 so as to implement the above described functionalities in which the bearer control entity 200 is involved and which are carried out by the bearer control entity.

Figure 12:
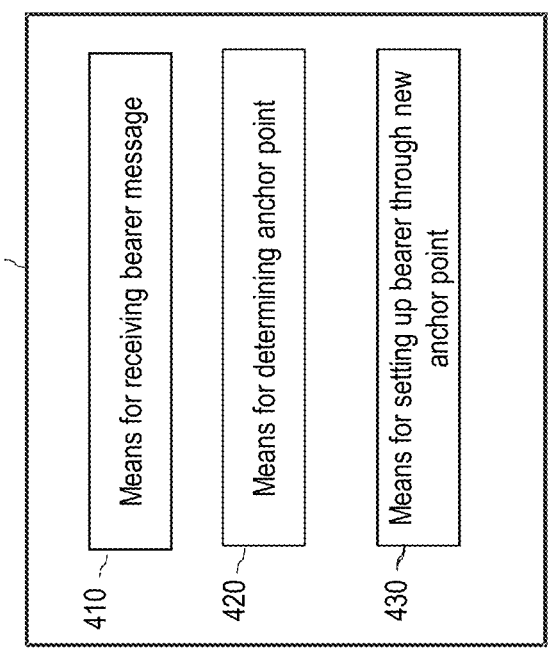
FIG. 12 shows another example schematic representation of a bearer control entity configured to move a bearer to a new point.

FIG. 12 shows a further embodiment of the bearer control entity, here entity 400. The entity 400 comprises means 410 for receiving a bearer message, by way of example a bearer modification message or a bearer setup message. Furthermore means 420 are provided for determining the new anchor point. Furthermore, means 430 are provided set up the bearer through the new anchor point.

FIG. 13 discloses a schematic view of a gateway 700, which can handle the data packet flow. The gateway comprises an interface 710, which is provided for the exchange of information of user data or control messages with other entities, wherein the transmitter 711 is especially configured to transmit transmission condition parameters for a data packet flow to the flow control entity 100. The receiver 712 is used for receiving user data or control messages. A processor 720 is configured to determine the transmission conditions for the data packet flow. The processor 720 is responsible for the operation of the gateway 700 as discussed above. The gateway 700 furthermore comprises a memory 730, which includes suitable program code to be executed by the processor 720 so as to implement the above described functions in which the gateway is involved and which are carried out by the gateways.

FIG. 14 shows a further embodiment of a gateway 900. The gateway comprises means 910 for determining transmission condition parameters for the data packet flow handled by the gateway. Furthermore means 920 are provided for transmitting the determined transmission condition parameters to the flow control entity shown in FIG. 9 or 10.

It should be understood that entities discussed above in connection with FIGS. 9 to 13 can comprise additional functional modules not discussed above for the sake of clarity. Furthermore, it should be understood that aspects in connection with FIGS. 9 to 12 may be incorporated by software, hardware, or a combination of hardware and software.

From the discussion above some general conclusions can be drawn:

As far as the flow control entity 100 is concerned, the flow control entity 100 can transmit a bearer modification request to the bearer control entity 200. It can receive a request from the bearer control entity to provide information about the new anchor point. The information about the new anchor point is then transmitted to the bearer control entity.

As another option a bearer modification request is transmitted from the flow control entity to the bearer control entity including the information about the new anchor point.

The transmission conditions may be determined by the flow control entity based on information about a transmission performance received from a gateway (old anchor point) or router or radio access node through which the data packet flow is currently transmitted. The gateways or routers can determine parameters such as latency, packet loss or jitter based on test traffic or looking at a time stamp provided in the data packets.

For informing the bearer control entity a bearer modification request may be transmitted to the bearer control entity 200, which comprises information about the new anchor point. For determining that a transmission condition of the data packet flow has changed, it is possible that information about a transmission performance is received from an old anchor point or router through which the data packet flow is transmitted.

For determining the new anchor point, it is possible to determine a target zone in the communications network in which the radio access node (through which the data packet flow is transmitted) is located, wherein the new anchor point in the target zone is determined which provides a sufficient performance for the data packet flow. The sufficient performance can mean that the lowest latency should be obtained, however other conditions such as for example low jitter or low packet loss may be used.

Additionally, the flow control entity can calculate optimized end-to-end bearer paths for different zones of the communications network comprising the zone dependent new anchor points. The flow control entity 100 can store the fully qualified domain name, FQDN, for each of the new anchor points in the domain name server 131 of the flow control entity. The domain name server 131 can be part of the flow control entity 100 or maybe located separately from the flow control entity. The FQDN is stored in the DNS 131 representing the best anchor point in the zone for all Radio Access Nodes of the zone.

The request received from the bearer control entity can be a domain name system, DNS, request. Furthermore, it is possible that the information about the new anchor point transmitted to the bearer control entity comprises an address of the new anchor point.

As far as the bearer control entity is concerned the new anchor point may be requested from a domain name system, DNS, server of the flow control entity. Accordingly, the new anchor point is determined for a performance optimized user based on information provided and controlled by the flow control entity 100.

When the new anchor point is received, an address of the new anchor point may be received.

The bearer control entity may furthermore determine whether the user is a service optimized user which is provided with a better service for the data packet flow in comparison to other users. If the user is a service optimized user the new anchor point is requested from the flow control entity. If not, the normal domain name server of the network is contacted. Additionally it is possible that the new anchor point is received from the flow control entity without request, and that the new anchor point is only used by the bearer control entity when the user is a service optimized user.

Summarizing the application provides a possibility to provide sensitive services (for example services sensitive to latency, jitter or packet loss) by subdividing the service area, the communications network, into zones representing specific service level agreements. It is possible to optimally choose the application anchor point based on interworking of the flow control entity with the application layer. Accordingly, the best overall average quality of experience for the user of the data packet flow is provided.

The invention claimed is:

1. A method for operating a flow control entity configured to control a data packet flow in a radio access network and a transport network of a communications network, the method comprising:

determining that a transmission condition for the data packet flow through the communications network has changed;

determining through which radio access node the data packet flow is transmitted;

determining a new anchor point that keeps required service characteristics or improves existing service characteristics for the data packet flow in dependence on the radio access node, wherein determining the new anchor point comprises determining a target zone in the communications network in which the radio access node is located and determining the new anchor point in the target zone providing a sufficient performance for the data packet flow; and informing a bearer control entity about the new anchor point.

2. The method according to claim 1, wherein informing the bearer control entity comprises:

transmitting a bearer modification request to the bearer control entity;

receiving a request, from the bearer control entity, to provide information about the new anchor point; and transmitting information about the new anchor point to the bearer control entity.

3. The method according to claim 1, further comprising:
calculating optimized end-to-end bearer paths for different zones of the communications network comprising zone dependent new anchor points.

4. The method according to claim 3, further comprising:
storing a Fully Qualified Domain Name (FQDN) for each of the new anchor points in a domain name server controlled by the flow control entity.

5. A non-transitory computer readable storage medium having stored thereon computer program code to be executed by at least one processor of a flow control entity configured to control a data packet flow in a radio access network and a transport network of a communications network, wherein execution of the computer program code causes the at least one processor to execute a method according to claim 1.

6. A method for operating a bearer control entity configured to control a bearer for a data packet flow in a communications network, the method comprising:

receiving a bearer modification message for a user of the data packet flow from a flow control entity configured to control the data packet flow for the user in a radio access network and a transport network of the communications network;

receiving information about a new anchor point for the bearer from the flow control entity, wherein the new anchor point keeps required service characteristics or improves existing service characteristics;

determining whether the user is a service optimized user which is provided with a better service for the data packet flow in comparison to other users, wherein the new anchor point is requested from the flow control entity when the user is the service optimized user; and moving a current anchor point for the data packet flow to the new anchor point.

7. The method according to claim 6, further comprising requesting the new anchor point from a domain name server controlled by the flow control entity.

8. The method according to claim 6, further comprising:
determining whether the user is a service optimized user which is provided with a better service for the data packet flow in comparison to other users, wherein the new anchor point received from the flow control entity is only used by the bearer control entity when the user is the service optimized user.

9. A non-transitory computer readable storage medium having stored thereon computer program code to be executed by at least one processor of a bearer control entity configured to control a bearer for a data packet flow in a communications network, wherein execution of the computer program code causes the at least one processor to execute a method according to claim 6.

10. A flow control entity configured to control a data packet flow in a radio access network and a transport network of a communications network, the flow control entity comprising:

at least one processor; and memory, wherein the memory includes instructions executable by said at least one processor so that the flow control entity is operative to:

determine that a transmission condition for the data packet flow through the communications network has changed;

determine through which radio access node the data packet flow is transmitted;

determine a new anchor point that keeps required service characteristics or improves existing service characteristics for the data packet flow in dependence on the radio access node, wherein determining the new anchor point so that the flow control entity id further operative to: determine a target zone in the communications network in which the radio access node is located and determining the new anchor point in the target zone providing a sufficient performance for the data packet flow; and inform a bearer control entity about the new anchor point.

11. The flow control entity according to claim 10, wherein the memory includes instructions for informing the bearer control entity so that the flow control entity is further operative to:

transmit a bearer modification request to the bearer control entity;

receive a request, from the bearer control entity, to provide information about the new anchor point; and transmit information about the new anchor point to the bearer control entity.

12. The flow control entity according to claim 10, wherein the memory includes instructions so that the flow control entity is further operative to:

calculate optimized end-to-end bearer paths for different zones of the communications network comprising zone dependent new anchor points.

13. The flow control entity according to claim 10, wherein the memory includes instructions so that the flow control entity is further operative to:

store a Fully Qualified Domain Name (FQDN) for each of the new anchor points in a domain name server controlled by the flow control entity.

14. A bearer control entity configured to control a bearer for a data packet flow in a communications network, the bearer control entity comprising:

at least one processor; and memory, wherein the memory includes instructions executable by said at least one processor so that the bearer control entity is operative to:

receive a bearer modification message for a user of the data packet flow from a flow control entity configured to control the data packet flow for the user in a radio access network and a transport network of the communications network;

receive information about a new anchor point for the bearer from the flow control entity, wherein the new anchor point keeps required service characteristics or improves existing service characteristics;

determine whether the user is a service optimized user which is provided with a better service for the data packet flow in comparison to other users, wherein the bearer control entity requests the new anchor point from the flow control entity when the user is the service optimized user; and move a current anchor point for the data packet flow to the new anchor point.

15. The bearer control entity according to claim 14, wherein the memory includes instructions so that the bearer control entity is further operative to:

request the new anchor point from a domain name server controlled by the flow control entity.

16. The bearer control entity according to claim 14, wherein the memory includes instructions so that the bearer control entity is further operative to:

determine whether the user is a service optimized user which is provided with a better service for the data packet flow in comparison to other users, wherein the bearer control entity only uses the new anchor point received from the flow control entity when the user is the service optimized user.

* * * * *